United States Patent
Storz

(10) Patent No.: US 10,936,305 B2
(45) Date of Patent: Mar. 2, 2021

(54) CONFIGURATION GUIDE EDITOR TO GENERATE INTERACTIVE CONFIGURATION GUIDES AND AUTOMATION CONTENT

(71) Applicant: SAP SE, Walldorf (DE)

(72) Inventor: Georg Storz, Hessigheim (DE)

(73) Assignee: SAP SE, Walldorf (DE)

( * ) Notice: Subject to any disclaimer, the term of this patent is extended or adjusted under 35 U.S.C. 154(b) by 120 days.

(21) Appl. No.: 15/810,434

(22) Filed: Nov. 13, 2017

(65) Prior Publication Data

US 2019/0146782 A1     May 16, 2019

(51) Int. Cl.
G06F 8/71      (2018.01)
G06F 8/60      (2018.01)
G06F 9/451     (2018.01)
G06F 9/50      (2006.01)

(52) U.S. Cl.
CPC .......... *G06F 8/71* (2013.01); *G06F 8/60* (2013.01); *G06F 9/453* (2018.02); *G06F 9/5077* (2013.01)

(58) Field of Classification Search
None
See application file for complete search history.

(56) References Cited

U.S. PATENT DOCUMENTS

| | | | |
|---|---|---|---|
| 7,546,575 B1 * | 6/2009 | Dillman | G06F 8/10 717/102 |
| 7,743,373 B2 | 6/2010 | Avram et al. | |
| 8,584,119 B2 * | 11/2013 | Ellington | G06F 8/71 717/174 |
| 8,739,124 B2 | 5/2014 | Ritter et al. | |
| 8,938,734 B2 | 1/2015 | Misovski et al. | |
| 9,069,646 B2 | 6/2015 | Rothley et al. | |
| 9,152,402 B2 * | 10/2015 | Scheidel | G06F 8/61 |
| 9,189,226 B2 | 11/2015 | Driesen et al. | |
| 2009/0037801 A1 | 2/2009 | Ye et al. | |
| 2009/0320019 A1 * | 12/2009 | Ellington | G06F 8/71 717/177 |
| 2013/0159378 A1 | 6/2013 | Misovski et al. | |
| 2014/0109083 A1 * | 4/2014 | Scheidel | G06F 8/61 717/177 |

* cited by examiner

*Primary Examiner* — S. Sough
*Assistant Examiner* — Cheneca Smith
(74) *Attorney, Agent, or Firm* — Fish & Richardson P.C.

(57) ABSTRACT

Implementations of the present disclosure include methods, systems, and computer-readable storage mediums for receiving the configuration model from a configuration definition repository, the configuration model providing one or more configuration definitions for configuring a software product within a landscape, receiving a landscape plan, the landscape plan defining one or more components of a landscape, on which the software product is to be configured, determining that at least one configuration task of a plurality of configuration tasks is to be executed automatically, the plurality of configuration tasks being included in a workflow that is provided based on the one or more configuration definitions, and the landscape plan, and, in response, automatically executing the at least one configuration task using at least a portion of the automation content.

17 Claims, 10 Drawing Sheets

FIG. 4C

Employee Central Integration (JB1) - 1711

SAP_CLOUD_EMPLOYEE_CENTRAL_JB1_1711

Details    Condition Groups    Conditions    Targets    Roles    Tasks    Task Conditions

*406*

| Target Id | State | Version | Target Type | Description |
|---|---|---|---|---|
| EC_TENANT | | 051 | EC_TENANT | Employee Central Tenant |
| ERP_SYSTEM | | 051 | ABAP_SERVER | ERP System |
| SCI_TENANT | | 051 | SCI_TENANT | SAP Cloud Integration |
| SCP_SYSTEM | | 051 | SAP_CLOUD_PLATFORM | SAP Cloud Platform |

*FIG. 4D*

Employee Central Integration (JB1) - 1711

SAP_CLOUD_EMPLOYEE_CENTRAL_JB1_1711

Details   Condition Groups   Conditions   Targets   Roles   Tasks   Task Conditions   Configuration Definitions

| Role Id | Version | State | Description |
|---|---|---|---|
| ABAP_ADMIN | 0.0.1 | -- | ABAP Administrator |
| MULTIPLE | 0.0.1 | -- | Multiple Roles |
| SCI_ADMIN | 0.0.1 | -- | SAP Cloud Integration |
| SCP_ADMIN | 0.0.1 | -- | SAP Cloud Platform Administrator |
| SECURITY_EXPERT | 0.0.1 | -- | Security Expert |

CONFIGURATION GUIDE EDITOR TO GENERATE INTERACTIVE CONFIGURATION GUIDES AND AUTOMATION CONTENT

BACKGROUND

Enterprises can provide computer-implemented solutions (e.g., application-based products and/or services) in multiple types of deployments. Example deployments can include on-premise deployments, and cloud-hosted deployments. On-premise deployments can be described as applications (e.g., computer-executable programs) that are installed, and executed using hardware (e.g., computers, servers) of the customer consuming the applications. Cloud-hosted deployments can be described as applications that are installed, and executed using hardware of a cloud service provider (e.g., a server farm provided by a third-party service provider). In some examples, enterprises can provide hybrid solutions that include both on-premise and cloud-hosted deployments. However, hybrid solutions incur integration, and configuration requirements for the enterprise providing the hybrid solution, and users of the hybrid solution. The integration and configuration processes can be both resource, and time intensive.

SUMMARY

Implementations of the present disclosure include computer-implemented methods for providing interactive configuration guides, and automation content for configuring software application deployments.

In some implementations, actions include receiving the configuration model from a configuration definition repository, the configuration model providing one or more configuration definitions for configuring a software product within a landscape, receiving a landscape plan, the landscape plan defining one or more components of a landscape, on which the software product is to be configured, determining that at least one configuration task of a plurality of configuration tasks is to be executed automatically, the plurality of configuration tasks being included in a workflow that is provided based on the one or more configuration definitions, and the landscape plan, and, in response, automatically executing the at least one configuration task using at least a portion of the automation content. Other implementations include corresponding systems, apparatus, and computer programs, configured to perform the actions of the methods, encoded on computer storage devices.

These and other implementations may each optionally include one or more of the following features: the at least one configuration task is automatically executed by a configuration execution runtime; the configuration execution runtime is remote, and is provided within a configuration target, the configuration target being a component of the landscape; the at least one configuration task is automatically executed by a script; each configuration definition is provided based on annotations to a computer-readable configuration guide, and the automation content provided from a configuration expert of an enterprise providing the software product; the automation content includes one or more of a condition indicating a configuration task that can be skipped, a condition group, a target definition indicating a component of the landscape, a role definition indicating a role of a user required to perform a respective configuration task, and an annotation that can be selected for navigating within the landscape; and the configuration is executed as at least part of an integration of multiple software products, at least one software product including an on-premise product, and at least one software product including a cloud-hosted product.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 4A-4F depict example screenshots in accordance with implementations of the present disclosure.

Like reference symbols in the various drawings indicate like elements.

DETAILED DESCRIPTION

Figure 1:
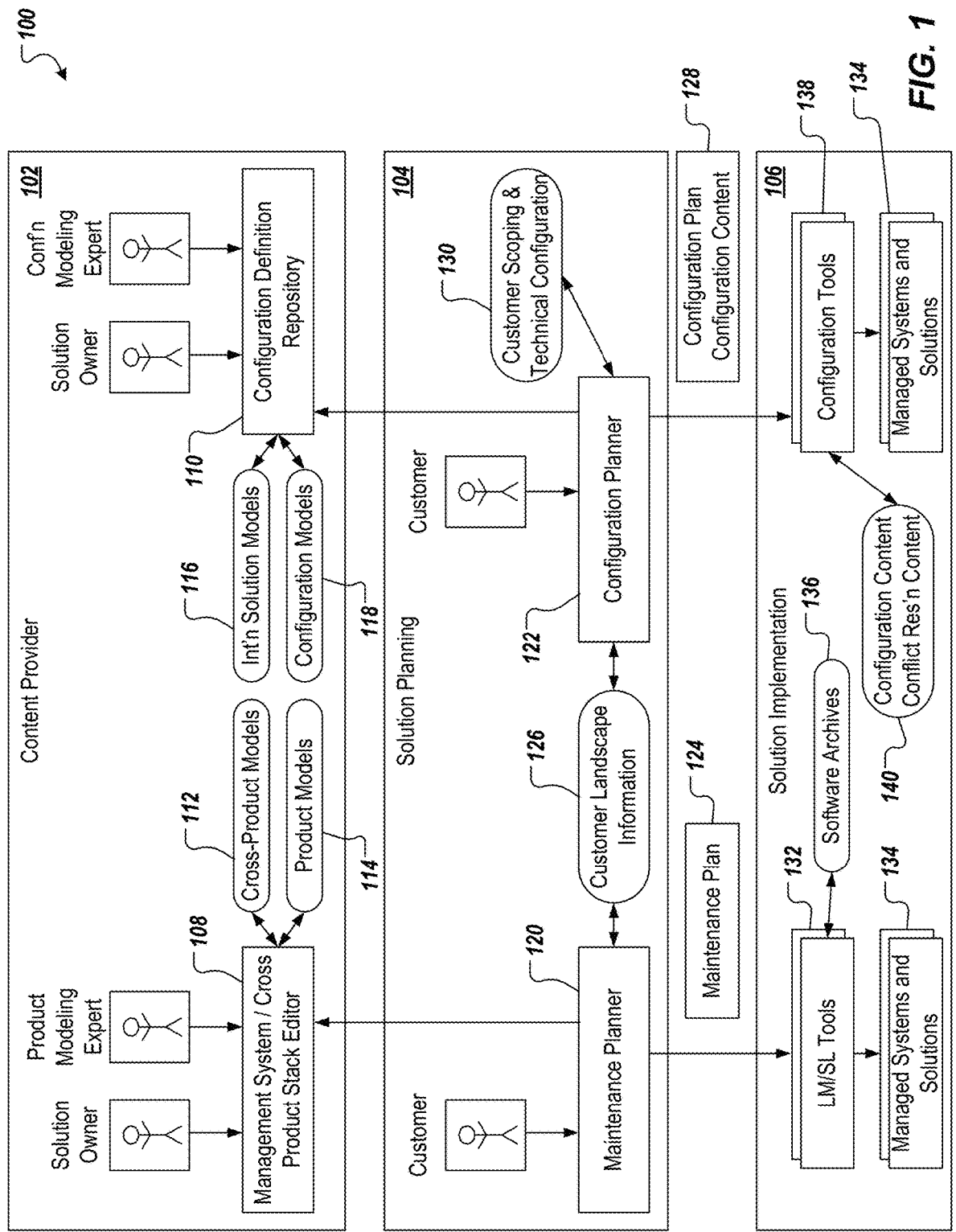
FIG. 1 depicts an example conceptual architecture in accordance with implementations of the present disclosure.

Implementations of the present disclosure include computer-implemented methods for providing interactive configuration guides, and automation content for configuring software application deployments. More particularly, implementations of the present disclosure are directed to generating interactive configuration guides, and automation content using a central metadata model. In accordance with implementations of the present disclosure, and as described in further detail herein, a central location, and a central content model are provided to structure information with a semantic data model for enabling automation, and simplifying consumption. In some implementations, configuration-related artifacts (e.g., sequences, tasks, configuration units, configuration components, parameters, technical scopes, user roles) are provided in a central repository for performing tasks. Example tasks include generating standard documentation (e.g., generic documents, specific documents), generating manual task descriptions, and semi-automated content, exchanging configuration definitions, configuration plans, and configuration execution, and decoupling exchange of content and execution in an automation runtime.

To provide further context for implementations of the present disclosure, and as introduced above, enterprises can provide computer-implemented solutions (e.g., application-based products and/or services) in multiple types of deployments. As used herein, a solution refers to one or more computer-executable programs. Example deployments can include on-premise, and cloud-hosted deployments. On-premise deployments can be described as applications (e.g., computer-executable programs) that are installed, and executed using hardware (e.g., computers, servers) of the customer consuming the applications. Cloud-hosted deployments can be described as applications that are installed, and executed using hardware of a cloud service provider (e.g., a server farm provided by a third-party service provider). In some examples, enterprises can provide hybrid solutions that include both on-premise, and cloud-hosted deployments.

Implementations of the present disclosure are described in further detail herein with reference to an example hybrid solution. It is contemplated, however, that implementations of the present disclosure can be realized with any appropriate configuration. The example hybrid solution includes SAP Business Suite 4 SAP HANA (referred to herein as S/4HANA) provided as an on-premise deployment, and SAP Applications provided as cloud-hosted deployments. Both S/4HANA and the SAP Applications are provided by SAP SE of Walldorf, Germany. In general, S/4HANA can be described as a suite of solutions that is built on SAP HANA, SAP's proprietary operational database system, and in-memory computing platform. Example SAP Applications include SAP Ariba, SAP Hybris, SAP SuccessFactors, and SAP Fieldglass. Implementations of the present disclosure are described in further detail herein with reference to SAP SuccessFactors, as a non-limiting example, which can be described as a human capital management (HCM) solution, which includes a suite of products (e.g., Employee Central, Employee Central Payroll, Employee Central Service Center).

As also introduced above, a hybrid solution incurs integration, and configuration requirements for the enterprise providing the hybrid solution (e.g., provider enterprise), and users (e.g., customer enterprises). This can include, for example, a user being on-boarded to the hybrid solution. However, the integration and configuration processes can be relatively complex, requiring multiple computer-implemented integration/configuration tools, and is both computing resource (e.g., processor, memory), and time intensive.

In some examples, a to-be-integrated product (solution) can include configuration definitions, and guidelines provided by the entity providing the product (e.g., solution owner, developer). For example, Employee Central of SAP SuccessFactors, described above by way of example, is a product that can be integrated to a customer system (e.g., landscape), and includes associated configuration guidelines (e.g., Employee Central Configuration (JB1), Minimal Setup Guide, etc.). In some examples, integration includes performing tasks. An example task includes creating user credentials (e.g., using a web user interface (UI)).

In further detail, the implementation of an on-premise or a cloud (on-demand) solution requires the execution of several configuration steps. The configuration steps are typically documented in configuration guides (e.g., official configuration guides for solutions, and internal configuration guides for the operation of cloud solutions). Traditional attempts to automate configuration guides face multiple problems. Example problems include: the author of the configuration guide is not the person who produces automation content; configuration guides include chapters, paragraphs, and references to other documents, but no machine-readable structures with semantically defined entities are provided; with shorter release cycles, the lifecycle of the software does not fit to the lifecycle of the configuration guides; and automation experts are typically experts in a specific automation technology, and/or automation language.

In view of the foregoing, implementations of the present disclosure are directed to providing interactive configuration guides, and automation content for configuring software application deployments. More particularly, implementations of the present disclosure enable document authors (e.g., authors of configuration guides) to enter semantic information associated with configuration-related artifacts into a central repository. Example configuration-related artifacts include, without limitation, sequences, tasks, configuration units, configuration components, parameters, technical scopes, and user roles. In some implementations, and as described in further detail herein, the information stored in the central repository is used to: generate standard documentation (e.g., knowledge is stored in the central repository, and documentation is generated); provide the documentation as generic documentation, and/or specific documentation (e.g., technical scopes and parameters can be applied to the documentation); provide manual task descriptions, and semi-automated content; perform exchange of configuration definition, configuration plan (with scoping and parameters), and configuration execution; and provide decoupled exchange of content and execution within a specific automation runtime.

FIG. 1 depicts an example conceptual architecture 100 in accordance with implementations of the present disclosure. In FIG. 1, the example conceptual architecture 100 includes a content provider view 102, a solution planning view 104, and a solution implementations view 106.

In the depicted example, the content provider view 102 includes a management system and cross-product stack editor 108, and a configuration definition repository 110. The management system and cross-product stack editor 108 enables a product owner, and/or a product modeling expert to create, and/or edit product models 112, and cross-product models 114. In some examples, a product model is provided as a data model that includes a data representation of a product (e.g., SAP SuccessFactors Employee Central Integration (Cloud Solution), SAP Business Suite, SAP S/4HANA 750). In some examples, a cross-product model is a data model that includes a data representation of an integration solution for integrating multiple products (e.g., different products on cloud, and/or on-premise, potential landscape options, defining release dependencies between product models). An example cross-product model can represent integration of SAP SuccessFactors Employee Central Integration and SAP Business Suite. The configuration definition repository 110 enables a product owner, and/or a configuration modeling expert to create, and/or edit integration solution models 116, and configuration models 118.

In accordance with implementations of the present disclosure, a configuration model provides structural information to a source format, and can include conditions, condition groups, targets, roles, tasks, and task conditions. In some implementations, the configuration model is used to provide a configuration guideline, and to enable automation (at least partial automation) of configuration tasks. That is, and as described in further detail herein, a configuration model can be used by one or more tools for automated configuration of solutions, and providing configuration guides describing tasks to be performed, roles for tasks, conditions, and the like.

In the depicted example, the solution planning view 104 includes a maintenance planner 120, and a configuration planner 122. In some examples, the maintenance planner 120 is used by a customer to produce a maintenance plan 124 based on customer landscape information 126. In general, the customer landscape information can describe the underlying technical infrastructure, in which a software product (solution) is installed, and executes. In some examples, the configuration planner 120 is used by the customer to produce a configuration plan and configuration content 128 based on customer scoping and technical configuration data 130.

In the depicted example, the solution implementation view 106 includes lifecycle management (LM) and software logistics (SL) tools 132 that can be used to implement the maintenance plan 124 in managed systems and solutions 134 based on software archives 136. The solution implementation view 106 also includes configuration tools 138 that can use the configuration plan and configuration content 128 to configure the managed systems and solutions 124 based on configuration content and conflict resolution content 140.

In some implementations, during a design time (e.g., conceptually depicted as the content provider view 102 of FIG. 1), the product owner (e.g., an enterprise that provides the software product) defines the configuration scenario, and, working with a configuration modelling expert, provides the configuration content. In some implementations, this information is combined in a configuration model that is used to provide a configuration guide, and automation content. In some examples, a configuration guide, and automation content can be provided for respective automation tools. In some implementations, during planning time (e.g., conceptually depicted as the solution planning view 104 of FIG. 1), automation content, documentation, implementation plans, workflow structures, and the like are provided based on the configuration model. In some examples, implementation decisions can be considered, and can be based on one or more options of the configuration scenario, the chosen landscape, scenario parameters and technical parameters. In some implementations, during production use (e.g., conceptually depicted as the solution implementation view 106 of FIG. 1), the automation content provided in the planning time, which contains the implementation-specific scoping and parameters, is used to execute configuration. In some examples, the configuration depends on a specific sequence to configure reuse components on the local system, for example, and to configure technical components and connectivity.

With reference to the above-introduced example, Employee Central of SAP SuccessFactors can be provided as an example integration solution to be deployed in an example deployment model, such as hybrid, described above (e.g., core hybrid). The example integration solution can be deployed in multiple integration scenarios, each integration scenario implicating respective cross-product stacks, and configuration definitions. For the example of Employee Central, example integration scenarios, and respective cross-product stacks, and configuration definitions include:

TABLE 1

Example Integrations Scenarios

| Integration Scenario | Cross Product Stack | Configuration Definitions |
| --- | --- | --- |
| SAP ERP is leveraged for Payroll/Time Management for EC Mastered Employees | EC-SAP HCI | 1, 7 |
| | Direct | 1 |
| EC Time Off/Payroll in SAP ERP | SAP HCI | 3 |
| | Direct | 3 |
| EC Payroll Time Sheet/ Payroll in SAP ERP | SAP HCI | 3 |
| | Direct | 3 |
| Global OM Mastered in EC, data needed in ERP for workflows | SAP HCI | 2 |
| | Direct | 2 |
| Cost Center mastered in ERP | SAP HCI | 4 |
| | Direct | 4 |

In some implementations, the configuration definitions are design-time objects that include manual task documentation (e.g., existing configuration guides), as well as the content required for the implementation (e.g., configuration plan), and/or for generating automation content (e.g., workflow, content files, source code) based on the respective configuration model.

In some implementations, automation relies on the configuration targets, the scoping parameters, the task list and the related task parameters, and task parameter value determinations. To relate documentation and automation multiple task levels are provided. Example task levels includes logical tasks, technical tasks, and configuration entities. In some examples, a logical task describes a respective task according the documentation data model (e.g., related to a task topic within a documentation management system (DMS)). In some examples, a technical task describes the task based on the configuration definition data model. In some examples, the configuration entity describes a defined configuration task based on a configuration entity definition. For example:

TABLE 2

Examples of Task Levels

| Logical Task | Technical Task | Configuration Entity |
| --- | --- | --- |
| Enabling Principal Propagation for HTTPS | Synchronize the configured trust (Target SCP) | SCP_PRINCIPAL_PROPAGATION |
| | Configure the subject pattern (Target SCC) | SCC_PRINCIPAL_PROPAGATION |
| | Ensure that Principal Propagation is enabled in SCP account (Target SCP) | SCP_PRINCIPAL_PROPAGATION |

TABLE 2-continued

Examples of Task Levels

| Logical Task | Technical Task | Configuration Entity |
|---|---|---|
| | Import the System Certificate for principal propagation into the ERP system (Target ERP) | ABAP_SSL_SERVER_CERT ABAP_ICM_RESTART |
| | Configure the Internet Communication Manager (Target ERP) | ABAP_PROFILE_PARAMETER |
| | Map SCP identities to ERP user profiles | ABAP_EXTID_MAPPING |

In the example of Table 2, the principal propagation is an authentication mechanism that provides a secure way of forwarding the identity of a cloud user to a system (e.g., an enterprise resource planning (ERP) system).

In some implementations, the configuration entities provide for re-use, abstraction, and hiding micro-logic. In some examples, configuration entities are the re-used parts of the configuration definition, and document which parameters are required, and what characteristic the parameters have. In some examples, the configuration entities serve as an abstraction layer between configuration content, and application program interface (API) calls. For example, configuration entities provide descriptions of the required parameters, and their characteristics in an API-independent format. In this manner, the configuration content is provided in a unified format. Further, the configuration entities hide API consumption micro-logic. For example, automation of a robust meaningful configuration task cannot be achieved with one API call. Typical examples can include: different API calls depending on the existence of an object; multiple API calls depending on the granularity of the APIs; and reading all attributes, changing some attributes, updating all attributes.

In some implementations, and as introduced above, a configuration entity describes what must be configured, and what parameters are required. This definition can be provided independent from the existence of real automation features. In some implementations, the configuration content related to a configuration entity describes the parameters, and the characteristics of the parameters (e.g., fixed value, calculated value based on other parameters, standard parameter). In some implementations, the runtime-specific implementation provides for a specific automation runtime for the configuration task(s), and contains the required micro-logic to execute the automation. In some examples, the implementation for a configuration entity can be done as close as possible to the API to avoid distributed micro logic and to enable easy consumption.

In some examples, a configuration plan (e.g., the configuration plan 128 of FIG. 1) corresponds to a configuration, and to the planning of an implementation project with a defined target landscape, and a defined scope and parameter set for the configuration definition. The configuration plan contains the configuration content for all configuration entities. In some examples, the configuration execution relates to a configuration plan, and includes an execution with a specific tool of the configuration content (e.g., a configuration tool 138 of FIG. 1). For example, the tool can perform at least a portion of the configuration in an automated way, and/or can manage execution of a manual task. In any, the configuration execution monitors the status of each task (e.g., done, open, error), and provides traceability of changes (e.g., who has changed what at what time).

Deliverables and responsibility of content for respective entities will now be described. Example entities include the integration solution, the cross-product stacks, the configuration definitions, the configuration content, configuration entity definitions, configuration entity runtime, and APIs.

In some examples, deliverables associated with each integration solution include a definition and structure of the respective integration solution. Responsibility for these deliverables lies on the integration owner, and a scenario expert. In some examples, deliverables associated with a cross-product stack include the definition and rules for the cross-product stack editor. Responsibility for these deliverables lies on the integration owner, and a product expert. In some examples, deliverables for the configuration definition include the configuration definition itself, and documentation for any related manual tasks. Responsibility for these deliverables lies with the integration owner, and a documentation expert. In some examples, deliverables associated with the configuration content include the configuration content itself, which is provided in the configuration definition. Example configuration content includes, without limitation, parameter determination rules (e.g., fixed values, calculated values, rule-based values), scopes, parameters, tasks, and declarative content. Responsibility for these deliverables lies with the integration owner, and an automation expert.

In some examples, deliverables associated with the configuration entity definitions includes logical re-use tasks, and typical re-use pattern for different target platforms, as well as the definition of the abstract configuration entity with the required definition (e.g., parameter, parameter metadata, operations, documentation). Responsibility for these deliverables lies with the solution/platform provider, and the automation expert. In some examples, deliverables associated with the configuration entity runtime include the target runtime specified for a respective configuration entity. Responsibility for this deliverable lies with the solution/platform provider, and the automation expert. In some examples, deliverables associated with each API include the API itself, and maintenance thereof. Responsibility for these deliverables lies with a respective component owner, and a feature expert.

Figure 2:
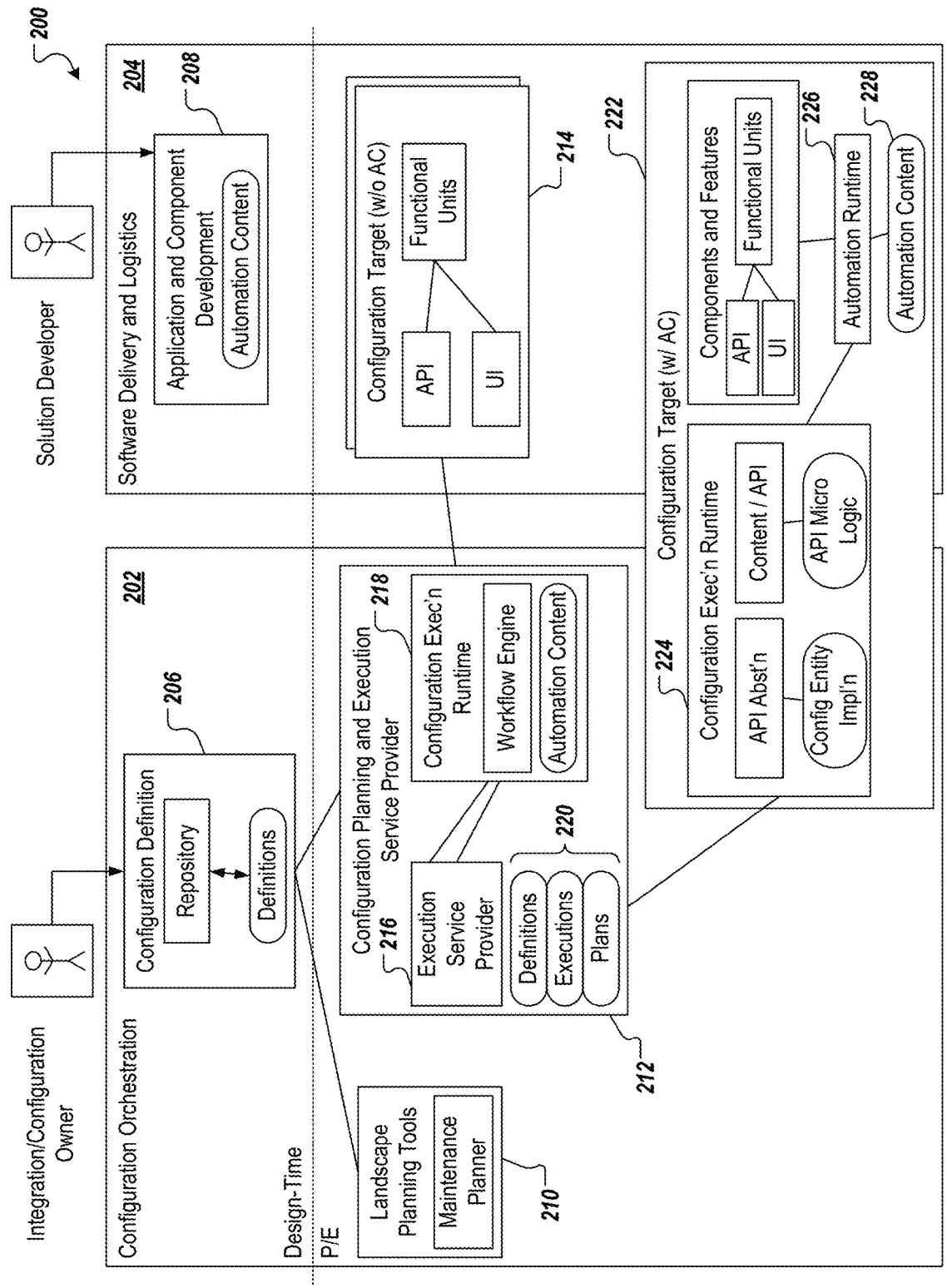
FIG. 2 depicts an example architecture in accordance with implementations of the present disclosure.

FIG. 2 depicts an example architecture 200 in accordance with implementations of the present disclosure. The example architecture 200 includes configuration orchestration 202, and software delivery and logistics 204 for standard product delivery, portions of each being split between a design-time phase, and a planning and execution (P/E) phase (above and below the dashed line, respectively). In the depicted example, in the design-time phase, the configuration orchestration 202 includes a configuration definition module 206, and the software delivery and logistics 204 includes an application and component development module 208. The configuration definition module 206 includes a central repository of configuration definitions (i.e., the configuration definition repository 110 of FIG. 1). As described herein, the repository stored configuration definitions with a well-defined content structure.

In the depicted example, in the planning and execution phase, the configuration orchestration 202 includes a landscape tools component 210, and a configuration planning and execution service provider 212, and the software delivery and logistics 204 includes one or more first configuration targets 214. The landscape tools component includes a maintenance planner, which provides landscape planning for integration scenarios with cross-product stack definitions. The configuration planning and execution service provider 212 includes an execution service provider 216, a configuration execution runtime 218, which includes a workflow engine and automation content), as well as configuration data (e.g., definitions, executions, plans) 220. The execution service provider 216 generates workflow definitions that can be processed by the workflow engine to perform configuration executions. The first configuration targets 214 include, for example, solutions that are to-be-configured without a local automation runtime, and without local automation content. Instead, the configurations targets 214 are configured using the configuration execution runtime 218.

The example architecture 200 also includes one or more second configuration targets 222. The second configuration targets 222 include, for example, solutions that are to-be-configured with a local automation runtime, and with local automation content. For example, the second configuration targets 222 each include a configuration execution runtime 224, an automation runtime 226, and automation content 228.

Implementations of the present disclosure provide an example configuration include integration of SAP SuccessFactors Employee Central Integration (Cloud Solution) with SAP S/4 HANA. It is contemplated, however, that implementations of the present disclosure can be realized in any appropriate integration and configuration scenario.

In some implementations, during the design-time, a configuration guide (e.g., computer-readable document) is enriched and annotated with automation enablement content. With reference to FIG. 2, a user (e.g., an agent of an integration/configuration owner) interacts with the configuration definition module 206 of the configuration orchestration 202 to perform one or more design-time tasks (e.g., inputting content, and providing definitions). In some examples, content includes, which configuration tasks are to be performed, which role is to perform respective configuration tasks, which target is each configuration task to be performed on, any conditions that are required for a respective configuration task to be performed, definitions for parameters used in a respective configuration (e.g., which parameters are fixed, reused between different tasks, are specific to a task), and which scopes/decisions are possible during the configuration.

In some examples, content includes general information regarding each of the products to be integrated. Example general information can include, without limitation, a product identifier (e.g., SAP_CLOUD_EMPLOYEE_CENTRAL_JB1_1711), a description (e.g., Employee Central Integration (JB1)-1711), a state of the product, a version of the product, a short text description (e.g., SAP Cloud JB1 1711, an application component identifier (e.g., CA-GTF-INT-EC), and configuration documentation (e.g., a hyperlink to a computer-readable file containing the configuration documentation).

In some examples, the content includes conditions, and/or group conditions. For example, if a condition exists, which would result in a configuration task being skipped, that condition is described in the condition content. As another example, a condition group can define what is to be decided, and which options are possible. In some examples, the content includes a target definition that defines which configuration tasks occur on which targets (i.e., components of the landscape). In some examples, a role definition defines which roles are required for execution of the configuration guide (e.g., Logon to the SAP S/4HANA system as Administrator; Logon to SAP S/4HANA system as Business Expert).

In some examples, the content includes annotations within the configuration guide that identifies targets, and enables direct navigation to each target. For example, an annotation can include a hyperlink within the configuration guide to navigate to a target (e.g., a user selects the hyperlink, and a UI associated with the target opens in a browser). In some examples, annotations can describe the parameters to be used during the configuration. For example, the annotations can provide information about re-use of a parameter (e.g., user provides a value for a parameter as a global parameter that is distributed to multiple tasks using parameter binding.

In some implementations, one or more configuration tasks are simplified by provision of product-specific automation report (e.g., an automation report specific to S/4 HANA). In general, implementations of the present disclosure avoid automation of an original configuration guide, through provision of a simplified configuration guide. In some examples, a user (e.g., an agent of the software developer) can interact with the software delivery and logistics 204 to simplify configuration requirements for a particular product, and provide automation concepts and automation content with the product delivery.

In some implementations, landscape planning is performed based on the configuration definition, and the solution definition. For example landscape planning is performed using the landscape planning tools 210 of FIG. 2. With reference to the example integration, the selection of the Employee Central Integration will identify that, for a specific integration scenario, a specific configuration definition has to be executed. Based on the definition of the targets the different products and installations for a specific customer are identified, and the customer is able to select the targets. Based on the product model, any required software changes can be determined (e.g., an upgrade to a new release, or support package level is required).

In accordance with implementations of the present disclosure the configuration is performed based on the configuration definition, and the landscape planning. For example, the configuration execution service provider 212 of FIG. 2 performs the configuration based on information provided from the configuration definition. In some examples, the execution service provider 216 generates a workflow based on the configuration definition. In some examples, the workflow includes multiple phases. In an example phase, one or more users of the customer (e.g., the enterprise for which the products are being integrated/configured) are assigned to the defined roles (e.g., administrator, security expert). In another example phase, the targets are defined, and can be refined (e.g., values from landscape planning are taken as default values, and can be edited). In another example phase, condition and scoping are conducted. In another example phase, configuration tasks are performed based on a sequence provided from the configuration definition.

In some examples, one or more configuration tasks are performed either in a remote configuration execution runtime (e.g., the configuration execution runtime 218 of FIG. 2), or in a local configuration execution runtime (e.g., the configuration execution runtime 224 of FIG. 2). In some examples, for a given configuration task, input of one or more parameter values can be selectively requested based on parameter bindings parameter. A configuration task can be performed as a manual workflow task, or as an automated workflow task. In some examples, if automated, the configuration task includes an automation service implementation within the configuration execution runtime (e.g., the configuration execution runtime 218 of FIG. 2).

Figure 3:
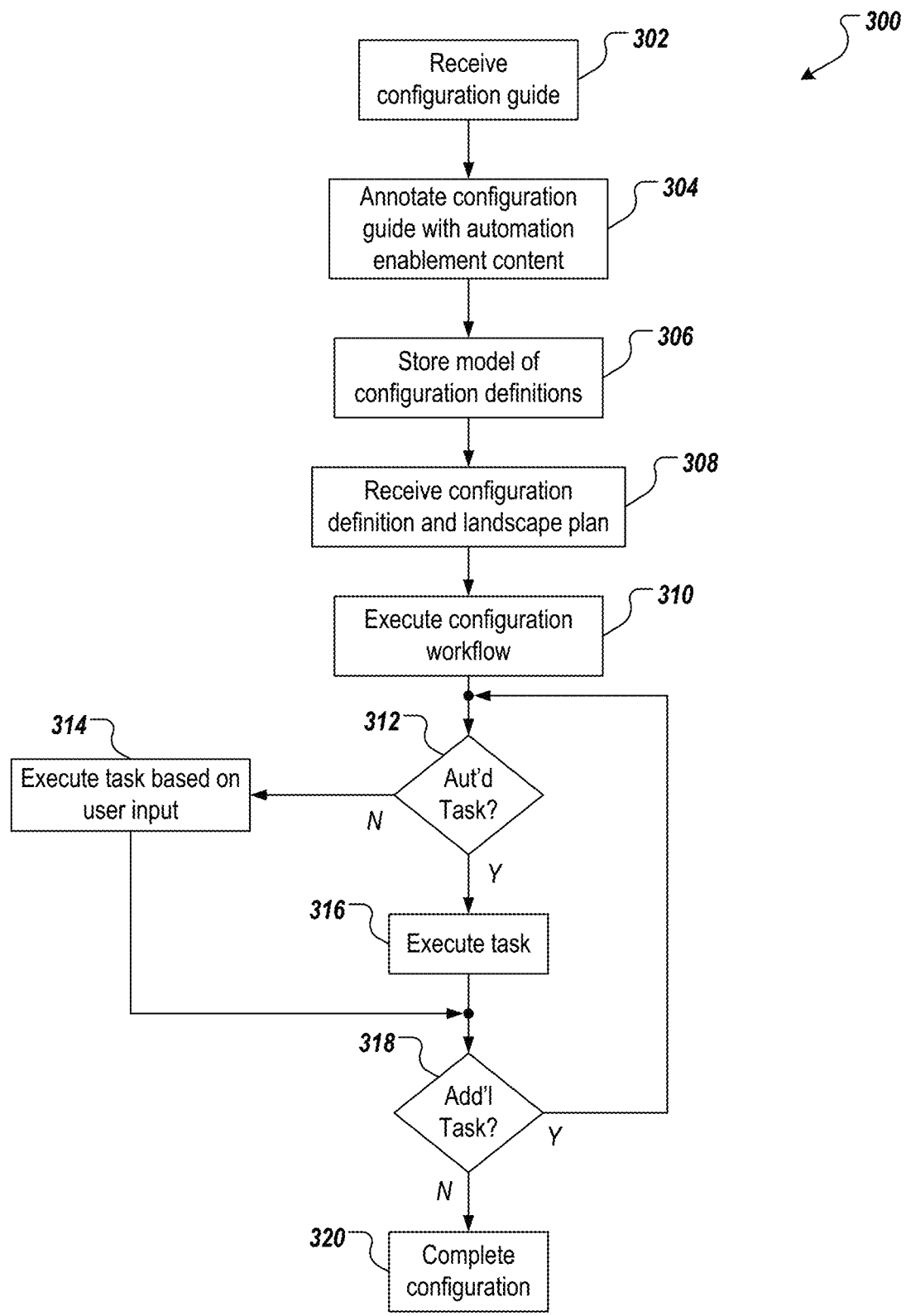
FIG. 3 depicts an example process that can be executed in accordance with implementations of the present disclosure.

FIG. 3 depicts an example process 300 that can be executed in accordance with implementations of the present disclosure. In some implementations, the example process 300 may be performed using one or more computer-executable programs executed using one or more computing devices.

A configuration guide is received (302). For example, the configuration guide can be received by the configuration orchestration 202 of FIG. 2. In some examples, the configuration guide is provided as a computer-readable file, and can be displayed on a display (e.g., in a browser). In some examples, the configuration guide details configuration tasks for a software product that is to be deployed and configured for a customer (e.g., enterprise). The configuration guide is annotated with automation enablement content (304). For example, and as described in detail herein, during the design-time, the configuration guide is enriched and annotated with automation enablement content, where a user (e.g., an agent of an integration/configuration owner) interacts with the configuration definition module 206 of the configuration orchestration 202 to perform one or more design-time tasks (e.g., inputting content, and providing definitions). In some examples, content includes, which configuration tasks are to be performed, which role is to perform respective configuration tasks, which target is each configuration task to be performed on, any conditions that are required for a respective configuration task to be performed, definitions for parameters used in a respective configuration (e.g., which parameters are fixed, reused between different tasks, are specific to a task), and which scopes/decisions are possible during the configuration.

A model of configuration definitions is provided and is stored (306). For example, and as described herein, a model is provided, which includes the configuration definitions, and is subsequently accessed to generate content for different execution runtimes. In some examples, the model is stored in the configuration definition repository 206 of the configuration orchestration 202. A configuration model and landscape plan are received (310). For example, the configuration planning and execution service provider 212 receives a configuration definition, and landscape plan for a to-be-configured product. In some examples, the configuration definition is provided form the configuration definition repository. In some examples, the landscape plan is received from one or more of the landscape planning tools 210.

A configuration workflow is executed (310). For example, the execution service provider 216 provides a workflow (e.g., multi-phase workflow, as described herein) that can be at least partially performed by one or more configuration execution runtimes (e.g., the (local) configuration execution runtime 218, the (remote) configuration execution runtime 224). It can be determined whether a next configuration task is an automated task (312). If the configuration task is not an automated task, the task is executed based on user input (314). For example, one or more UIs can be displayed to a user, through which the user can provide user input to perform the task. If the configuration task is an automated task, the task is automatically executed. For example, one of the (local) configuration execution runtime 218, the (remote) configuration execution runtime 224 executes the configuration task based on the automation content. It is determined whether any additional configuration tasks need be performed (318). If there is at least one additional configuration task, the example process 300 loops back. If there are no additional configuration tasks, the configuration is complete (320).

FIGS. 4A-4F depict example screenshots in accordance with implementations of the present disclosure.

Figure 4A:
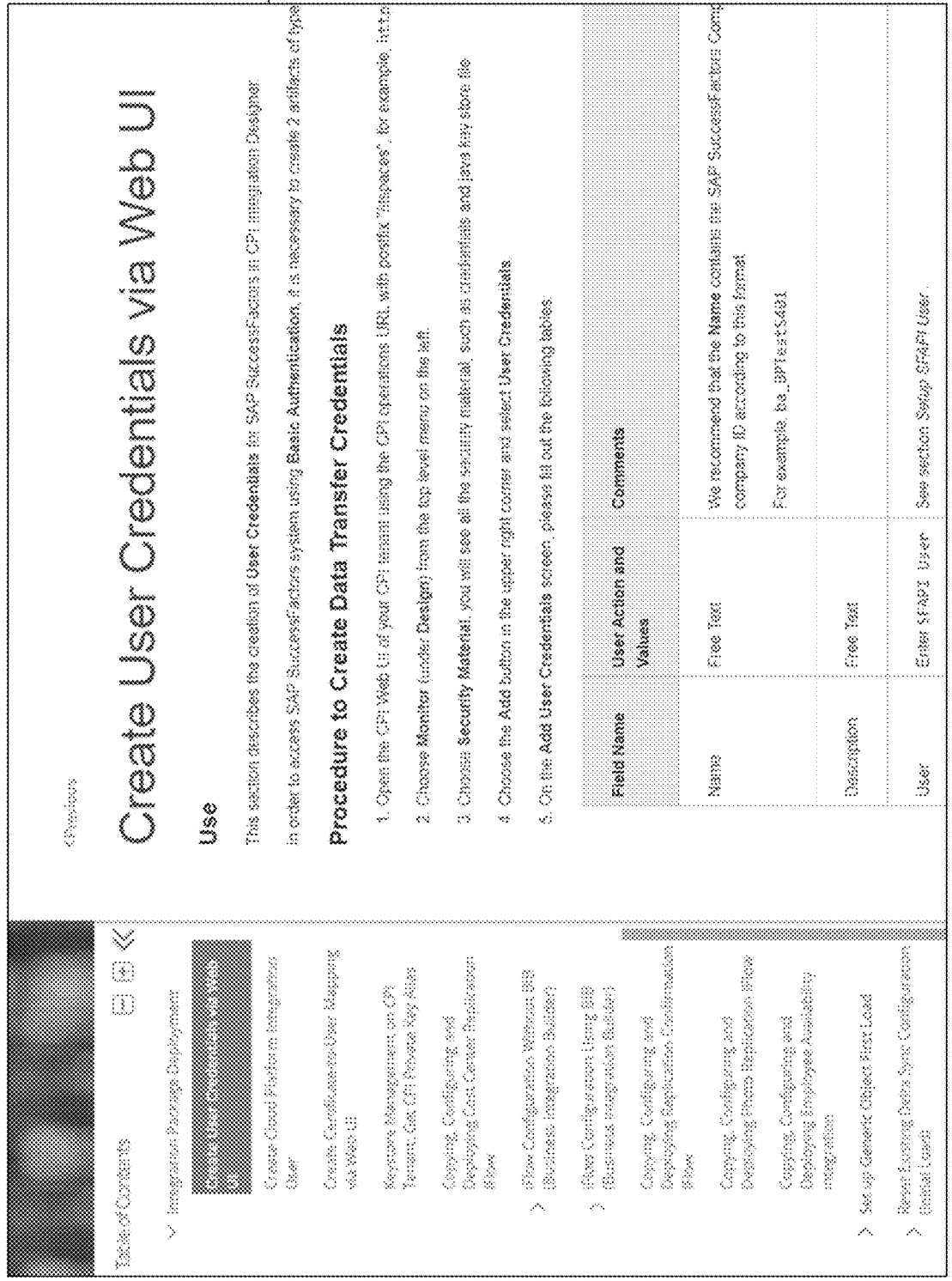

FIG. 4A depicts a screenshot 400 of a portion of an example configuration guide. In the depicted example, the portion of the configuration guide is directed to Integration Package Deployment, and the example task of creating user credentials using a web UI, which is part of setting up employee integration for Employee Central, introduced above. In accordance with implementations of the present disclosure, the depicted configuration guide can be provided from models stored within a configuration definition repository (e.g., the configuration definition repository 110 of FIG. 1), which provides structured configuration definitions (e.g., integration package deployment), and configuration tasks (e.g., creating user credentials). In short, FIG. 4A depicts an example result of guide creation in accordance with implementations of the present disclosure.

Figure 4B:
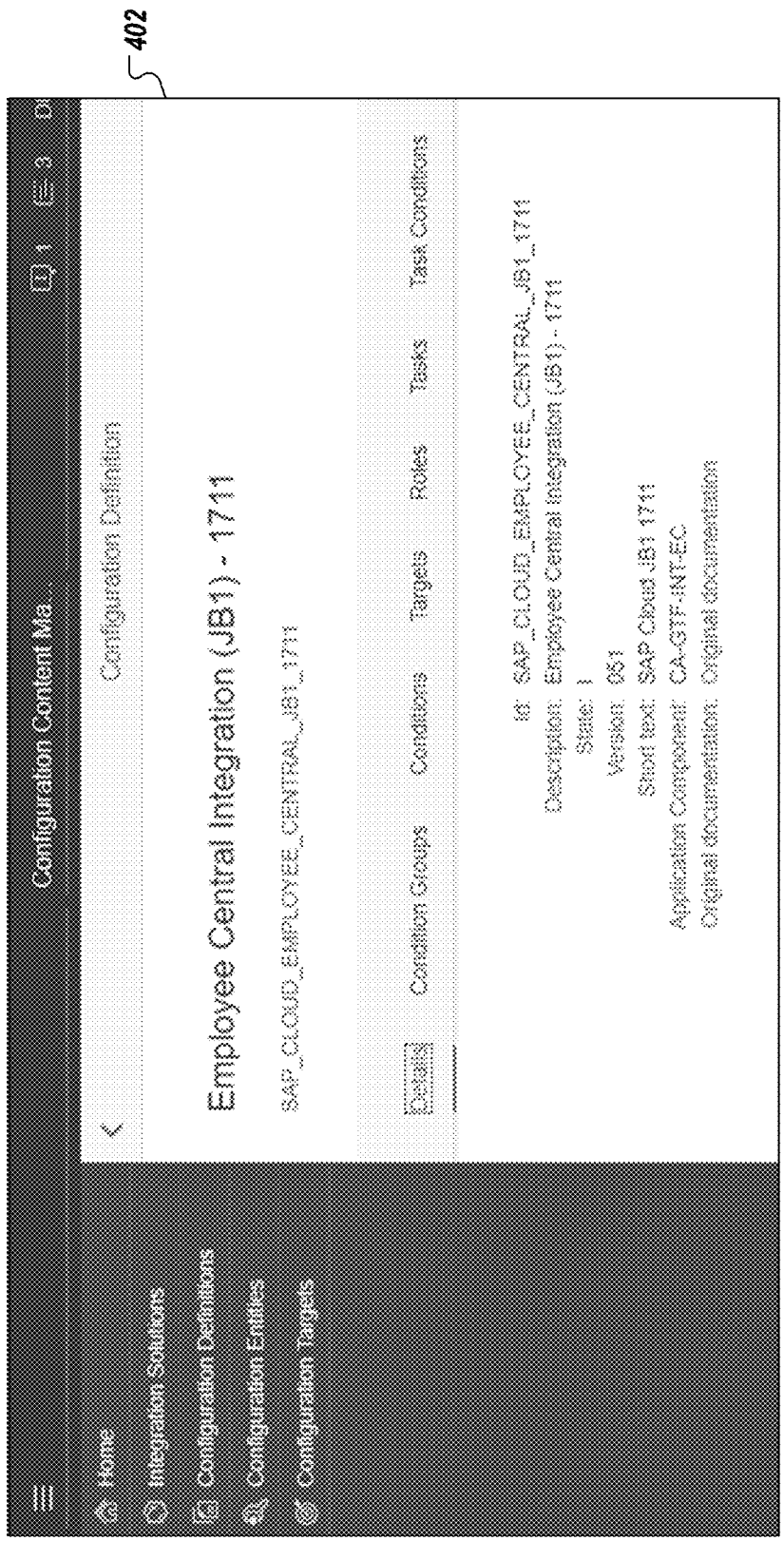

FIG. 4B depicts a screenshot 402 of a portion of a configuration content manager that can be used to assist in the example task. The depicted example corresponds to Employee Central, introduced above, and particularly, to integration of Employee Central. The configuration content manager provides relevant information including details, condition groups, conditions, targets, roles, tasks, task conditions, and the like. Further, the configuration content manager includes a link to original documentation, which enables a user to navigate to a guide (e.g., the configuration guide of FIG. 4A).

Figure 4C:
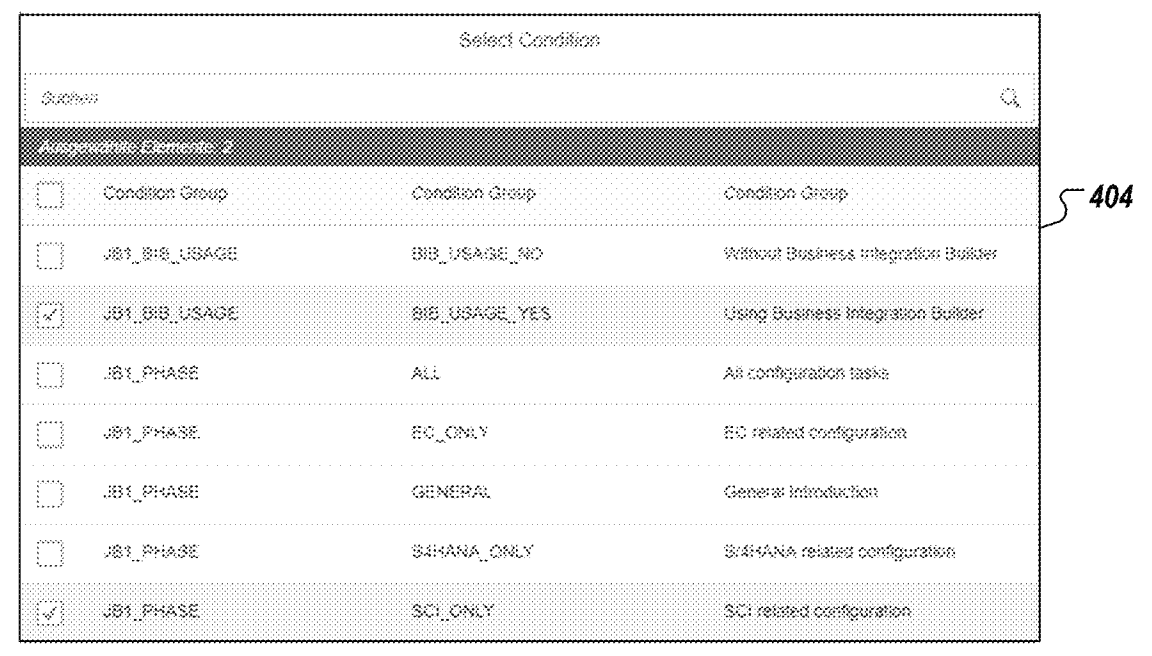

FIG. 4C depicts a screenshot 404 of an example condition selection UI. In some examples, the condition selection UI is displayed in response to user selection of the conditions from the screenshot 402 of FIG. 4B. In some examples, the condition selection UI enables a user to simulate the condition and scoping phase of the workflow. In some examples, the condition selection UI provides a view of the existing configuration definition with the condition and scoping rules applied. The user can use the condition selection UI to verify the results of the conditions (e.g., ensure that relevant tasks are provided, that irrelevant tasks have been removed).

FIG. 4D depicts a screenshot 406 of an example targets UI. In some examples, the targets UI is displayed in response to user selection of targets from the screenshots 402, or 404 of FIGS. 4A and 4B, respectively. In some examples, the targets UI provides a list of targets that are relevant to (e.g., impacted by) the integration. In the depicted example, example targets include an Employee Central (EC) tenant, an ERP system, a SAP cloud integration (SCI) tenant, and a SAP cloud platform (SCP) system.

Figure 4F:
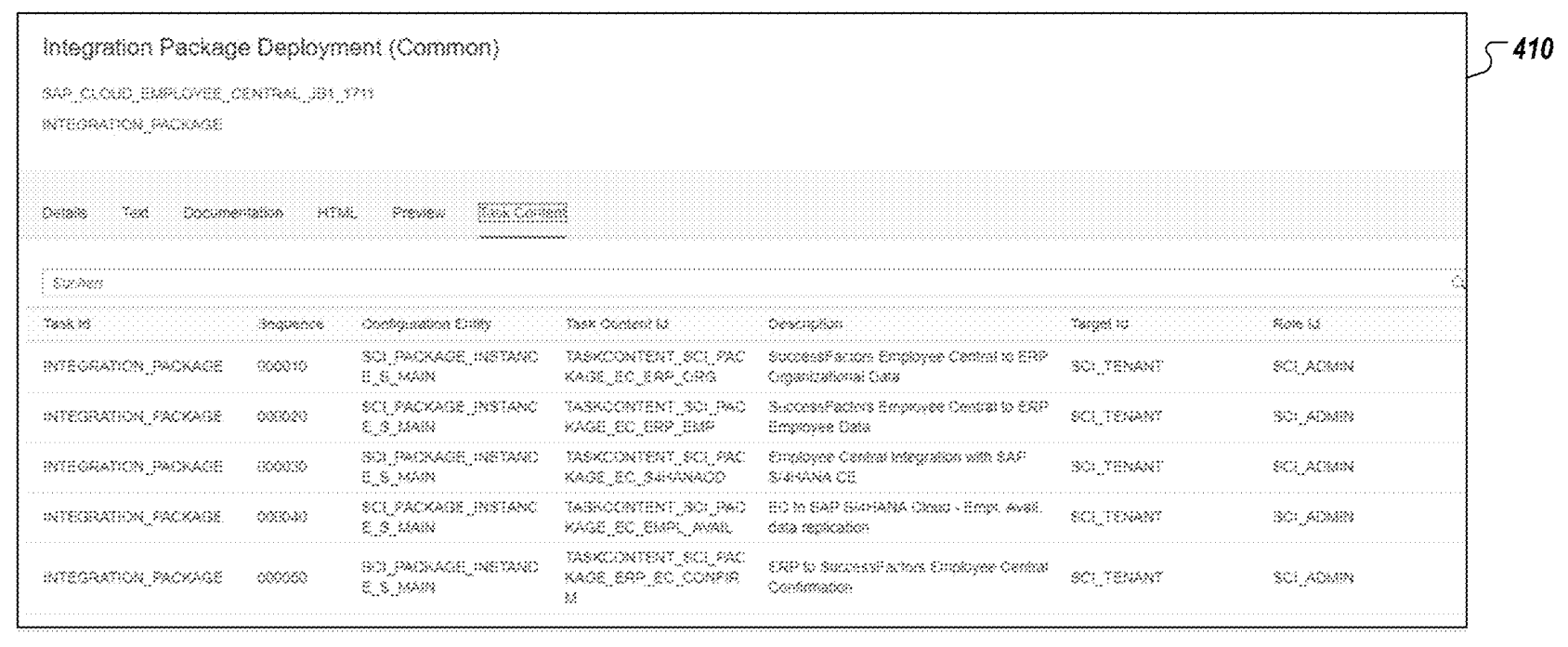

FIG. 4E depicts a screenshot 408 of an example roles UI. In some examples, the roles UI is displayed in response to user selection of roles from the screenshots 402, 404, or 406 of FIGS. 4A, 4B, and 4C, respectively. In some examples, the roles UI provides a list of roles (e.g., types of users, such as administrators, experts) that are relevant to (e.g., impacted by) the integration (e.g., perform tasks associated with the integration). FIG. 4F depicts a screenshot 410 of an example task content UI. In some examples, the task content UI provides a list of tasks that are to-be-performed for the integration, with respect configuration entity, task content, description, target, and role to perform the task. In some examples, a messaging channel (e.g., email) is used to communicate tasks, and other information to the user having the role associated with the task. For example, a message can be sent to the user indicating a task that the user is to perform, and providing a workflow (e.g., one or more steps) to be completed by the user to perform the task. In some examples, the message includes links to components (e.g., tools) that the user can interact with to perform at least a portion of the workflow. In some examples, the message can provide configuration information (e.g., parameters) that the user can provide as input in performing the workflow.

Figure 5:
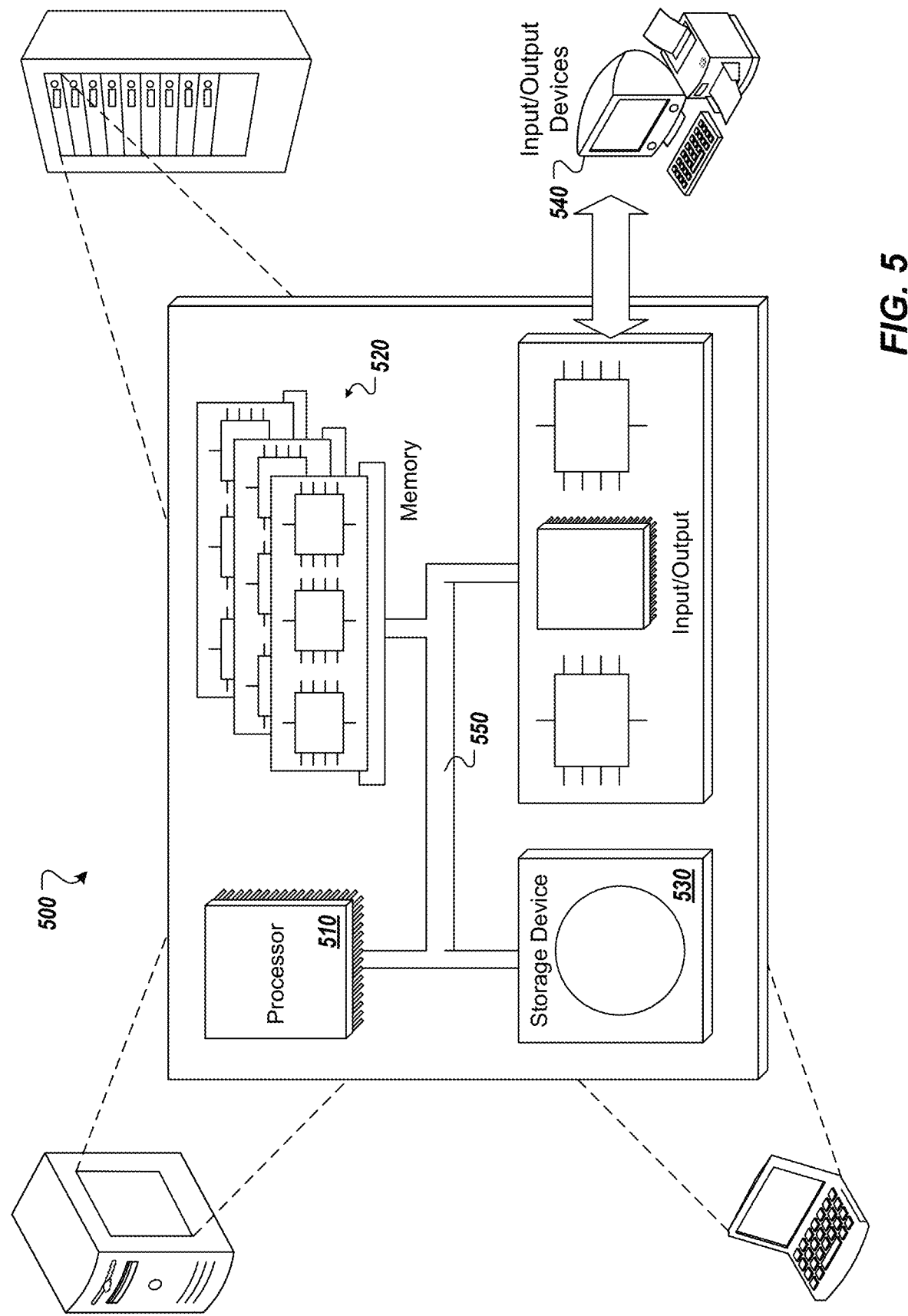
FIG. 5 is a schematic illustration of example computer systems that can be used to execute implementations of the present disclosure.

FIG. 5 depicts a schematic diagram of an example computing system 500. The system 500 may be used to perform the operations described with regard to one or more implementations of the present disclosure. For example, the system 500 may be included in any or all of the server components, or other computing device(s), discussed herein. The system 500 may include one or more processors 510, one or more memories 520, one or more storage devices 530, and one or more input/output (I/O) devices 540. The components 510, 520, 530, 540 may be interconnected using a system bus 550.

The processor 510 may be configured to execute instructions within the system 500. The processor 510 may include a single-threaded processor or a multi-threaded processor. The processor 510 may be configured to execute or otherwise process instructions stored in one or both of the memory 520 or the storage device 530. Execution of the instruction(s) may cause graphical information to be displayed or otherwise presented via a user interface on the I/O device 540.

The memory 520 may store information within the system 500. In some implementations, the memory 520 is a computer-readable medium. In some implementations, the memory 520 may include one or more volatile memory units. In some implementations, the memory 520 may include one or more non-volatile memory units.

The storage device 530 may be configured to provide mass storage for the system 500. In some implementations, the storage device 530 is a computer-readable medium. The storage device 530 may include a floppy disk device, a hard disk device, an optical disk device, a tape device, or other type of storage device. The I/O device 540 may provide I/O operations for the system 500. In some implementations, the I/O device 540 may include a keyboard, a pointing device, or other devices for data input. In some implementations, the I/O device 540 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors for providing interactive configuration guides, and automation content using a configuration model, the method comprising:
    receiving, by a local configuration execution runtime, the configuration model from a configuration definition repository, the configuration model providing one or more configuration definitions for configuring a software product within a landscape;
    receiving, by the local configuration execution runtime, a landscape plan, the landscape plan defining one or more components of the landscape, on which the software product is to be configured; and
    determining, by the local configuration execution runtime, that at least one configuration task of a plurality of configuration tasks is to be executed automatically at a configuration target, the plurality of configuration tasks being included in a workflow that is provided based on the one or more configuration definitions, and the landscape plan, the at least one configuration task comprising a logical task having one or more technical tasks and one or more configuration entities associated therewith, the logical task describing the at least one configuration task according to a documentation data model, a technical task of the one or more technical tasks describing the logical task based on the configuration model, and a configuration entity of the one or more configuration entities describing the at least one configuration task based on a configuration entity definition, and, in response to determining that at least one configuration task of a plurality of configuration tasks is to be executed automatically at a configuration target:
        communicating between the local configuration execution runtime and a remote configuration execution runtime at the configuration target for automatic execution of the at least one configuration task based on the logical task, the technical task, and the configuration entity;
        automatically executing, by an automation runtime within the configuration target, the at least one configuration task using at least a portion of the automation content.

2. The method of claim 1, wherein the configuration target is a component of the landscape.

3. The method of claim 1, wherein the at least one configuration task is automatically executed by a script.

4. The method of claim 1, wherein each configuration definition is provided based on annotations to a computer-readable configuration guide, and the automation content provided from a configuration expert of an enterprise providing the software product.

5. The method of claim 4, wherein the automation content comprises one or more of a condition indicating a configuration task that can be skipped, a condition group, a target definition indicating a component of the landscape, a role definition indicating a role of a user required to perform a respective configuration task, and an annotation that can be selected for navigating within the landscape.

6. The method of claim 1, wherein the at least one configuration task is executed as at least part of an integration of multiple software products, at least one software product comprising an on-premise product, and at least one software product comprising a cloud-hosted product.

7. A non-transitory computer-readable storage medium coupled to one or more processors and having instructions stored thereon which, when executed by the one or more processors, cause the one or more processors to perform operations for providing interactive configuration guides, and automation content using a configuration model, the operations comprising:
    receiving, by a local configuration execution runtime, the configuration model from a configuration definition repository, the configuration model providing one or more configuration definitions for configuring a software product within a landscape;
    receiving, by the local configuration execution runtime, a landscape plan, the landscape plan defining one or more components of the landscape, on which the software product is to be configured; and
    determining, by the local configuration execution runtime, that at least one configuration task of a plurality of configuration tasks is to be executed automatically at a configuration target, the plurality of configuration tasks being included in a workflow that is provided based on the one or more configuration definitions, and the landscape plan, the at least one configuration task comprising a logical task having one or more technical tasks and one or more configuration entities associated therewith, the logical task describing the at least one configuration task according to a documentation data model, a technical task of the one or more technical tasks describing the logical task based on the configuration model, and a configuration entity of the one or more configuration entities describing the at least one configuration task based on a configuration entity definition, and, in response to determining that at least one configuration task of a plurality of configuration tasks is to be executed automatically at a configuration target:
        communicating between the local configuration execution runtime and a remote configuration execution runtime at the configuration target for automatic execution of the at least one configuration task based on the logical task, the technical task, and the configuration entity; and
        automatically executing, by an automation runtime within the configuration target, the at least one configuration task using at least a portion of the automation content.

8. The computer-readable storage medium of claim 7, wherein the configuration target is a component of the landscape.

9. The computer-readable storage medium of claim 7, wherein the at least one configuration task is automatically executed by a script.

10. The computer-readable storage medium of claim 7, wherein each configuration definition is provided based on annotations to a computer-readable configuration guide, and the automation content provided from a configuration expert of an enterprise providing the software product.

11. The computer-readable storage medium of claim 10, wherein the automation content comprises one or more of a condition indicating a configuration task that can be skipped, a condition group, a target definition indicating a component of the landscape, a role definition indicating a role of a user required to perform a respective configuration task, and an annotation that can be selected for navigating within the landscape.

12. The computer-readable storage medium of claim 7, wherein the at least one configuration task is executed as at least part of an integration of multiple software products, at least one software product comprising an on-premise product, and at least one software product comprising a cloud-hosted product.

13. A system, comprising: a computing device; and a computer-readable storage device coupled to the computing device and having instructions stored thereon which, when executed by the computing device, cause the computing device to perform operations for providing interactive configuration guides, and automation content using a configuration model, the operations comprising:
  receiving, by a local configuration execution runtime, the configuration model from a configuration definition repository, the configuration model providing one or more configuration definitions for configuring a software product within a landscape;
  receiving, by the local configuration execution runtime, a landscape plan, the landscape plan defining one or more components of the landscape, on which the software product is to be configured; and
  determining, by the local configuration execution runtime, that at least one configuration task of a plurality of configuration tasks is to be executed automatically at a configuration target, the plurality of configuration tasks being included in a workflow that is provided based on the one or more configuration definitions, and the landscape plan, the at least one configuration task comprising a logical task having one or more technical tasks and one or more configuration entities associated therewith, the logical task describing the at least one configuration task according to a documentation data model, a technical task of the one or more technical tasks describing the logical task based on the configuration model, and a configuration entity of the one or more configuration entities describing the at least one configuration task based on a configuration entity definition, and, in response to determining that at least one configuration task of a plurality of configuration tasks is to be executed automatically at a configuration target:
  communicating between the local configuration execution runtime and a remote configuration execution runtime at the configuration target for automatic execution of the at least one configuration task based on the logical task, the technical task, and the configuration entity; and
  automatically executing, by an automation runtime within the configuration target, the at least one configuration task using at least a portion of the automation content.

14. The system of claim 13, wherein the configuration target is a component of the landscape.

15. The system of claim 13, wherein the at least one configuration task is automatically executed by a script.

16. The system of claim 13, wherein each configuration definition is provided based on annotations to a computer-readable configuration guide, and the automation content provided from a configuration expert of an enterprise providing the software product.

17. The system of claim 16, wherein the automation content comprises one or more of a condition indicating a configuration task that can be skipped, a condition group, a target definition indicating a component of the landscape, a role definition indicating a role of a user required to perform a respective configuration task, and an annotation that can be selected for navigating within the landscape.

\* \* \* \* \*